J. S. TUTTLE.
BALING PRESS.
APPLICATION FILED JUNE 29, 1908.
945,114.
Patented Jan. 4, 1910.
2 SHEETS—SHEET 2.
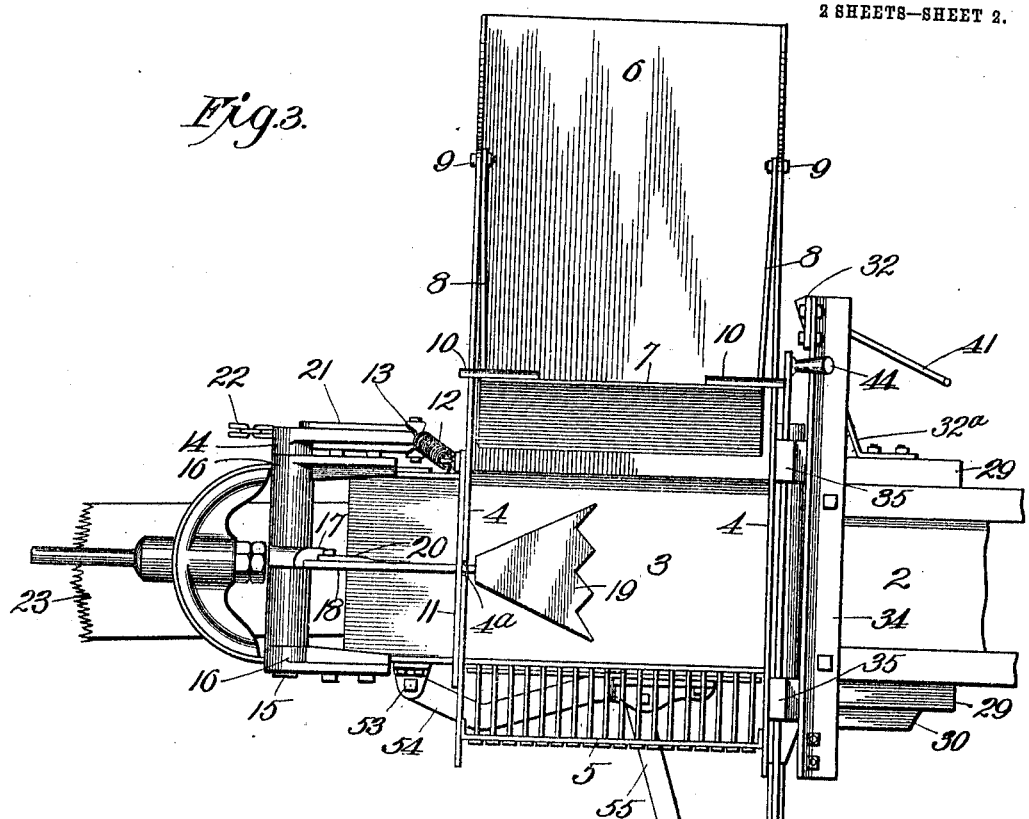
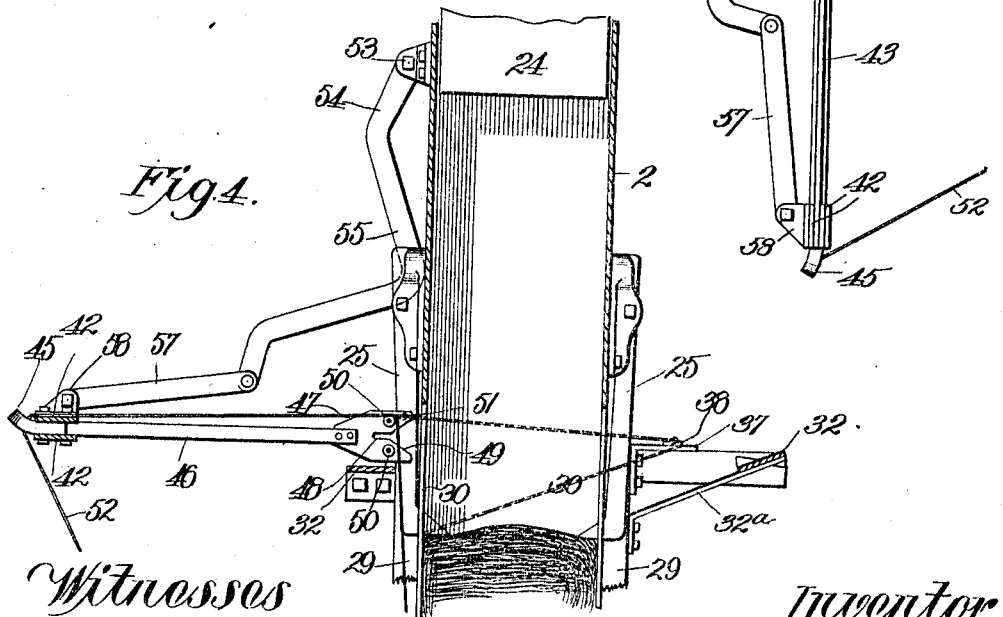
Witnesses
Frank R Glor
L. B. Wherritt
Inventor
J. S. Tuttle.
By George J. Thorp Atty.

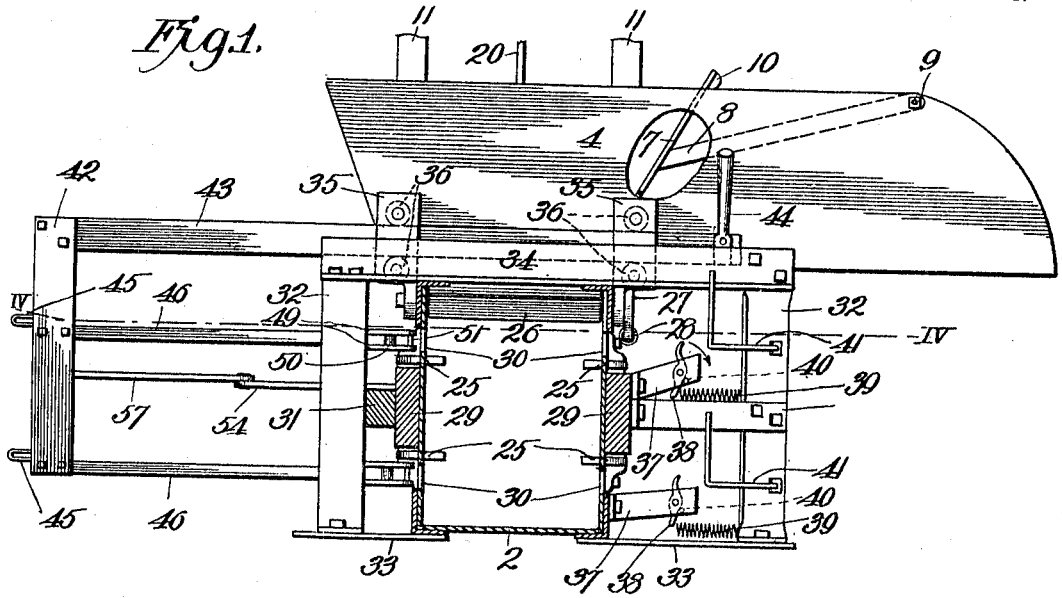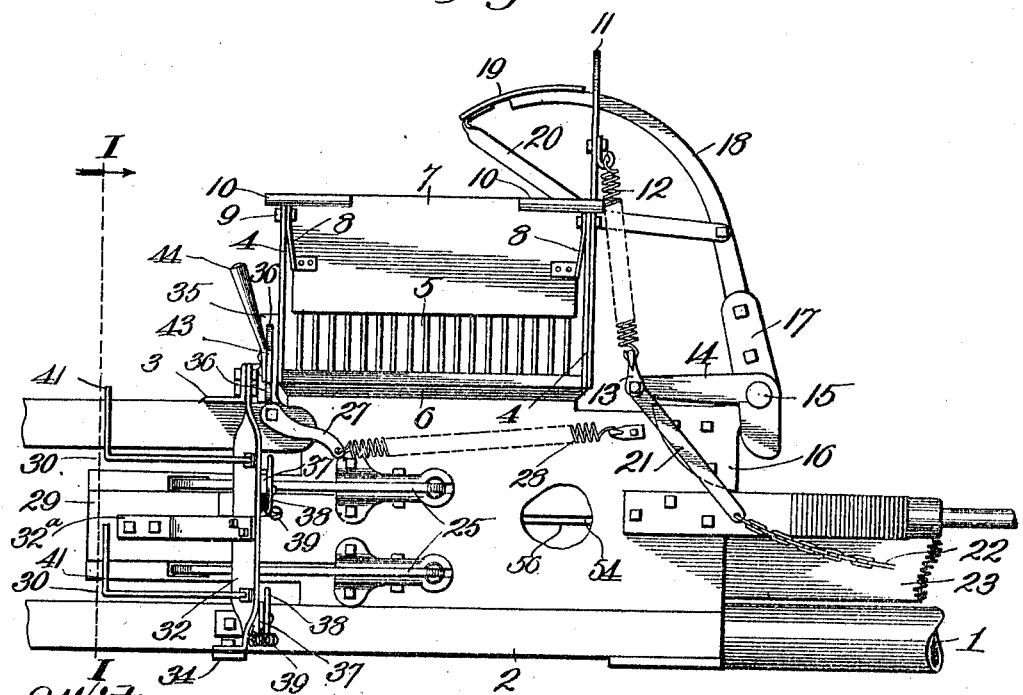

UNITED STATES PATENT OFFICE.

JOSIAH S. TUTTLE, OF KANSAS CITY, MISSOURI, ASSIGNOR OF ONE-HALF TO GEORGE ERTEL CO., OF QUINCY, ILLINOIS.

BALING-PRESS.

945,114.

Specification of Letters Patent.

Patented Jan. 4, 1910.

Application filed June 29, 1908. Serial No. 441,016.

*To all whom it may concern:*

Be it known that I, JOSIAH S. TUTTLE, citizen of the United States, residing at Kansas City, in the county of Jackson and State of Missouri, have invented certain new and useful Improvements in Baling-Presses, of which the following is a specification.

This invention relates to baling presses, and my object is to produce a horse-power press of such character that one man can feed it, control its operation, effect the completion of the encircling of each bale with wires and tie such wires, and perform such operations in less time proportionate to the output of completed bales, than two men can with the ordinary horse-power baling press lacking needles or mechanism for threading or passing the wires around the rear ends of the bales.

With this general object in view, the invention consists in certain novel and peculiar features of construction and organization as hereinafter described and claimed; and in order that it may be fully understood reference is to be had to the accompanying drawings, in which, Figure 1 is a cross section taken on the line I—I of Fig. 2. Fig. 2 is a view of the side of the press at which the operator stands. Fig. 3 is a top plan view. Fig. 4 is a horizontal section taken on the line IV—IV of Fig. 1.

In the said drawings 1 indicates a reach whereby the power mechanism (not shown) is connected to the baling case 2, provided with the usual top feed-opening 3.

A side-feed hopper, consists of side bars 4 disposed at opposite ends of the said feed-opening 3, a vertically-slotted or skeleton end-wall 5, a bottom 6 projecting laterally from the opposite side of the feed-opening from wall 5, and a movable wall 7 disposed above bottom 6, near the feed opening and adapted in conjunction with wall 5 and side walls 4 to concentrate and retain the baling material over the feed-opening so that such material may be properly forced downward into the baling case, as hereinafter explained. The wall 7 preferably terminates short of the bottom of the hopper as shown most clearly in Fig. 2, and is carried by the movable or swing-arms 8 pivoted at 9 to the side walls of the hopper, and projecting from said wall 7 and beyond its ends is a pair of arms 10 which are adapted by engaging the upper edges of the side walls, to limit the downward movement of the wall 7. By means of this hopper the attendant with a pitch-fork can stand upon the ground at one side of the press and place his loaded fork upon the bottom of the hopper and shove it forward until the baling material on the fork is over the feed-opening, it being understood that as he shoves the fork forward the material upon it causes wall 7 to swing up out of the way and then drop down behind such material so that as the fork is withdrawn wall 7 serves to effect the removal of the material from it. It will also be noticed that, by having the opposite wall 5, of slotted or skeleton form to permit the tines of the fork to project therethrough, the operator can readily dispose the bunch of baling material directly over the feed-opening. By having such wall slotted it may be stationed nearer wall 7 than would otherwise be possible as the heel of the fork should travel nearly to wall 5 to dispose the bulk of its load centrally between said wall and wall 7.

11 indicates an arch erected over the side wall of the hopper at the front end of the feed-opening and 12 is a retractile spring connected at one end to said arch and at the other to a link 13 pivoted to the crank-arm 14 of a rock-shaft 15 extending transversely of the baling case and journaled in bearing-brackets 16 bolted to the case. Shaft 15 is also equipped with a crank-arm 17 and secured to the same is a curved arm 18 projecting under arch 11 and adapted to operate in a vertical slot $4^a$ in the arch-equipped wall of the hopper.

19 is the presser-foot of the feeder, secured to the rear end of the arm 18 and connected with the latter also by a knee-brace 20, which also operates vertically in slot $4^a$.

21 is a link pivotally connected to the rear end of crank-arm 14 and to a chain 22 leading to the power-end of the machine and adapted to be pulled forward by any suitable means (not shown) after each recoil of the plunger-beam 23, the said beam being provided with the usual plunger 24 to reciprocate in the baling case, which plunger, assuming that the feeder has been depressed and that, from any cause, it fails to be re-elevated by spring 12 at the proper time, will strike the knee-brace 20 and force the feeder upward without injuring it.

25 indicates the usual retainers which project into the baling chamber for the purpose of preventing the compressed material from following the plunger in its recoil movement, and 26 indicates the folder of ordinary type and for the usual purpose, the folder being held down in the path of the baling material by the pull on its crank-arm 27, of the retractile spring 28 secured at its opposite end to the baling case.

29 are blocks secured to the outer sides of the baling case between the longitudinal slots 30 and 31 is a block secured to one of the bars 29 as a brace for a needle-guide frame constructed as follows: 32 are uprights arranged at opposite sides of the baling case and connected at their lower ends to the case by bars 33 and at their upper ends by a transverse bar 34 resting upon the top of the case and equipped with a pair of guides 35 provided with anti-friction rollers 36, the upright 32 at the side of the press where the attendant stands being connected to the adjacent block 29 by a knee brace 32ª. In about the vertical plane of rollers 36 and at the side of the machine where the attendant stands, a pair of brackets 37 project, one from the adjacent bar 29 and the other from the lower angle-bar of the baling case by preference, and pivoted to said brackets to operate in a vertical plane, is a pair of catches 38, held by the retractile springs 39 against the stop-pins 40 projecting from brackets 37, the opposite ends of said springs being secured to the adjacent upright 32 of the guide frame, and projecting from said upright is a pair of hooks 41, for a purpose which hereinafter appears.

A reciprocatory needle-carrying frame consists of a pair of upright bars 42 and a horizontal bar 43, the latter extending transversely through guides 35 between the rollers 36 thereof and having a handle 44 at its opposite end from bars 42, in order that the attendant by grasping said handle may reciprocate said frame. At its outer end the frame is provided with a pair of wire-guide loops 45 and it is also provided with a pair of inwardly-projecting needles 46, the head of each of said needles consisting of a pair of horizontal plates 47 spaced apart sufficiently to easily accommodate a wire and provided with vertically alined bifurcations or slots 48 having flaring mouths 49. At opposite sides of slots 48 and connecting the head-plates are anti-friction rollers 50 and near the extreme point of each needle at the side of the slot 48 nearest the feeder is a pin 51, which pins in conjunction with the adjacent rollers 50, form the eyes of the needles, the said needles being arranged in the horizontal planes of slots 30 of the baling case and of the upper ends of the catches 38.

52 indicates a baling wire arranged in operative relation to each needle as shown in Fig. 4, it being obvious by reference to said figure and Fig. 1, that when the needles are caused to move across through slots 30, they double the wires extending through loops 45 and the eyes of the needles and carry the wire-loops thus formed, through the baling case behind the bale ready for wiring, the wires being stretched tightly across rollers 50 in this operation so that as the needles emerge through the opposite sides of the case, the said portions of the wires between rollers 50 engage and push the catches against the resistance of their springs 39, as indicated by the arrow Fig. 1, the said springs returning the catches to their original upright positions within the loops of the wires so that as the needles are returned to their original positions, they leave the wires in engagement with the catches, as indicated by dotted lines, Fig. 4. The operator by preference, stops the baling operation in order to reciprocate the needle-carrying frame as explained, it being understood that the wires may extend from reels not shown, to the loops 45 and that when the needles are moved across the case and looped on the catches, the wire feeds from the reels or other points of supply, through loops 45, the opposite ends of the wires extending along the bale at the side opposite from the attendant and transversely across between such bale and the preceding bale not shown. After the needle-carrying frame is returned to its original position as explained, the operator lifts the looped wires off the catches and draws the former against the rear end of the bale and forwardly against the near side of the latter and slips said loops over hooks and in doing so he draws sufficient wire from the reels to permit the loops to lap the opposite or free ends of the wires projecting from between the bale being wired and the preceding bale. He then cuts the wires at the ends of the loops, by preference, and fastens together the ends of those portions of the wire extending around the bale. The next bale formed clamps the free ends of the wires extending from the reels against the rear end of the bale last wired and the succeeding wiring operations are repetitions of those described.

To guard against any possibility of the plunger striking and injuring or breaking the needles in the event that the operator failed to push the needle-carrying frame completely back to its original position, I pivot to the baling case at 53, a horizontally operative lever 54, provided with a V shaped or cam-portion 55 capable of working through a slot 56 in the adjacent side-wall of the baling case the opposite end of said lever being pivotally connected by a link 57 with a bracket 58 secured to the needle-carrying frame. As the needles are drawn across the case the cam-portion 55 swings through said slot 56 into the path of the plunger, and is of proportion that it will always project into the case unless the needles are wholly withdrawn therefrom, and consequently will be struck by the advancing plunger and pushed outwardly through said slot, thereby avoiding any possibility of injury to the needles by the plunger, in fact if the operator forgets to return the needle-carrying frame after drawing the needles through the case, the plunger will strike the cam-portion of the lever and effect the return of the needles to their original positions, as will be readily understood.

From the above description it will be apparent that a hopper of the character described, eliminates the necessity of a man standing upon the press to dispose the hay or other material to be baled in proper position to be forced down through the feed opening into the baling case by the automatic feeder and that the same man who pitchforks the baling material into the hopper after stopping the horse, who, of course needs no driver when trained for the work, draws the baling wires across the rear end of the bale to be wired while the plunger is withdrawn and returns the needles to their original position. He then slips the wire loops off the catches and onto the adjacent hooks which thus serve as gages to determine the amount of wire to be drawn from the reels to completely encircle the bale. He then cuts the looped portions of the wires and fastens together the ends of the wires which extend around the bale, performing all of these operations very quickly and without assistance, as will be readily seen.

It will be understood, of course, that I reserve the right to make such changes in the form, proportion, detail construction and organization of the parts as properly fall with the spirit and scope of the appended claims.

Having thus described the invention what I claim as new and desire to secure by Letters Patent, is:—

1. A baling press provided with a hopper overlying and communicating with the baling case and comprising a bottom projecting laterally from the feed-opening of the case, side walls, an end-wall at one side of the feed-opening and a yieldingly-depressed wall partitioning the hopper and disposed at the opposite side of the feed-opening from the first-named end-wall.

2. A baling press provided with a hopper overlying and communicating with the baling case and comprising a bottom projecting laterally from the feed-opening of the case, side walls, an end-wall at one side of the feed-opening, and a yieldingly depressed wall forming a partition for the hopper and sloping downward and toward the feed-opening.

3. A baling press provided with a hopper overlying and communicating with the baling case and comprising a bottom projecting laterally from the feed-opening of the case, side walls, a skeleton end-wall at one side of the feed-opening and a yieldingly-depressed wall partitioning the hopper and disposed at the opposite side of the feed-opening from the skeleton wall.

4. A baling press provided with a hopper overlying and communicating with the baling case and comprising a bottom projecting laterally from the feed-opening of the case, side walls, a skeleton end-wall at one side of the feed-opening, and a yieldingly-depressed wall forming a partition for the hopper and sloping downward and toward the feed-opening.

5. A baling press provided with a hopper overlying and communicating with the baling case and comprising a bottom projecting laterally from the feed-opening of the case, side walls, an end-wall at one side of the feed-opening, a wall forming a partition for the hopper, at the opposite side of the feed-opening and sloping downward and inward toward said opening, and arms carrying said last-named wall and pivoted to the side-walls.

6. A baling press provided with a hopper overlying and communicating with the baling case and comprising a bottom projecting laterally from the feed-opening of the case, side walls, an end-wall at one side of the feed-opening, a wall forming a partition for the hopper, at the opposite side of the feed-opening and sloping downward and inward toward said opening, arms carrying said last-named wall and pivoted to the side-walls, and means to normally support the sloping wall with its lower edge above and spaced from the bottom of the hopper.

7. A baling press provided with slots in the side walls of the baling case, baling-wire-carrying needles normally at one side of the case and adapted to move transversely through the same and said slots and in such action double such wires to form horizontal loops and carry the looped portions of such wires through the case and said openings, catches to be pressed aside by the looped portions of the wires, means to return said catches to their original positions to cause them to engage said loops, and hooks at the same side of the press as said catches and adapted to receive the loops of the wires after their removal from said catches.

8. A baling press provided with slots in the side walls of the baling case, baling-wire-carrying needles normally at one side of the case and adapted to move through the same and said slots and in such action double such wires to form horizontal loops and carry such looped portions through the case and such slots, catches to be sprung by the looped portions of the wires out of their path and to return to their original positions but within the loops the instant the latter clears them, and means connected to the needles, to be caused by the plunger of the press as it makes its compression stroke, to effect the return of the needles to their original positions.

9. A baling press provided with slots in the side walls of the baling case, a reciprocatory frame provided with needles and with guide eyes outward of the needles to coöperate with the eyes of the latter in supporting baling wires, means to advance the frame to project the needles through the slots of the case and in such action double the wires to form loops therein and carry such loops through the case and said slots, catches to be pressed aside by the looped portions of the wires, means to return the catches to their original positions to cause them to project through said loops, a lever pivoted to the baling case and provided with a V shape portion, and a link pivotally connecting said lever with the needle carrying frame, said V shaped portion of the lever being adapted to project into the case in the path of the plunger of the press, when the needles are not wholly withdrawn therefrom.

In testimony whereof I affix my signature, in the presence of two witnesses.

JOSIAH S. TUTTLE.

Witnesses:
L. B. WHERRITT,
G. Y. THORPE.